(12) United States Patent
Sasahara et al.

(10) Patent No.: US 8,374,756 B2
(45) Date of Patent: Feb. 12, 2013

(54) CONTROL DEVICE FOR AUTOMATIC TRANSMISSION

(75) Inventors: Kazuma Sasahara, Wako (JP); Takashi Satoyoshi, Wako (JP); Ryuta Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 12/844,827

(22) Filed: Jul. 28, 2010

(65) Prior Publication Data

US 2011/0029207 A1 Feb. 3, 2011

(30) Foreign Application Priority Data

Jul. 28, 2009 (JP) .................................. 2009-175214

(51) Int. Cl.
*G06F 7/00* (2006.01)
*G06F 17/00* (2006.01)
*G06F 19/00* (2006.01)
(52) U.S. Cl. ................. 701/51; 701/55; 701/56; 701/61; 701/66; 701/67
(58) Field of Classification Search .................. None
See application file for complete search history.

(56) References Cited

U.S. PATENT DOCUMENTS 8,073,604 B2 * 12/2011 Hwang et al. .................... 701/67

FOREIGN PATENT DOCUMENTS

| JP | 2-217660 | 8/1990 |
|---|---|---|
| JP | 2-221759 | 9/1990 |
| JP | 3-004068 | 1/1991 |
| JP | 10-122341 | 5/1998 |
| JP | 2000-065198 | 3/2000 |
| JP | 2004-156680 | 6/2004 |
| JP | 2006-046569 | 2/2006 |
| JP | 2008-101705 | 5/2008 |

\* cited by examiner

*Primary Examiner* — Paul Danneman
(74) *Attorney, Agent, or Firm* — Ditthavong Mori & Steiner, P.C.

(57) ABSTRACT

A control device for an automatic transmission includes a speed change controller configured to generate a speed change instruction. A temperature calculator is configured to calculate a temperature of at least one frictional engagement element among frictional engagement elements. A rotation difference calculator is configured to calculate a rotation difference between an input and an output of the at least one frictional engagement element. A determining unit is configured to determine whether the frictional engagement element is engageable or non-engageable based on the temperature and the rotation difference of the frictional engagement element and a pattern of the speed change instruction. The delay unit is configured to delay engagement until the determining unit determines that the frictional engagement element is engageable, if the determining unit determines that the frictional engagement element is non-engageable when the speed change controller generates the speed change instruction.

20 Claims, 5 Drawing Sheets

| SPEED CHANGE INSTRUCTION PATTERN / CLUTCH PLATE TEMPERATURE Tp | UPSHIFT | KICKDOWN | | |
|---|---|---|---|---|
| | | SPEED CHANGE BY ONE STAGE | DIRECT SPEED CHANGE BY TWO OR MORE STAGES | PROGRESSIVE SPEED CHANGE BY TWO OR MORE STAGES |
| FIRST REGION (SAFE) | ◯ | ◯ | ◯ | ◯ |
| SECOND REGION (WARNING) | × | ◯ | △(*2) | ◯ |
| THIRD REGION (DANGER) | × | △(*1) | × | △(*3) |

◯ : ENGAGEABLE   × : NON-ENGAGEABLE

△ : DETERMINE ENGAGEABLE OR NON-ENGAGEABLE WITH ROTATION DIFFERENCE

FIG. 6A FIG. 6B FIG. 6C

CONTROL DEVICE FOR AUTOMATIC TRANSMISSION

CROSS REFERENCES TO RELATED APPLICATIONS

The present application claims priority under 35 U.S.C. §119 to Japanese Patent Application No. 2009-175214, filed Jul. 28, 2009, entitled "Control Device For Automatic Transmission." The contents of this application are incorporated herein by reference in their entirety.

BACKGROUND OF THE INVENTION

1. Field of the Invention

The present invention relates to a control device for an automatic transmission.

2. Description of the Related Art

In many cases, a vehicle uses an automatic transmission that shifts a power transmission path including a plurality of speed change gear trains and hence automatically changes a speed by selectively performing engagement control for a frictional engagement element such as a speed change clutch. In recent years, a speed change operation of an automatic transmission (an engagement operation of a frictional engagement element) tends to be frequently performed in order to increase power of an engine and to improve quality in speed change of the automatic transmission. Accordingly, in the automatic transmission, a heat quantity of heat that is generated during the engagement operation of the frictional engagement element used for the speed change tends to be increased. In this situation, the frictional engagement element whose temperature is at a high temperature due to the heat generated during the speed change operation is cooled to a temperature equivalent to automatic transmission fluid (ATF) of the automatic transmission mainly through heat exchange with the ATF. Thus, to prevent the fluid temperature of the ATF from being increased is an important factor for the protection of the facing of the frictional engagement element from heat damage such as burnout.

In related art, the fluid temperature of the ATF is detected, and the torque generated by the engine is continuously decreased if the detected fluid temperature is a predetermined temperature or higher. However, a certain time is required for radiation until the heat generated by the frictional engagement element is cooled through the heat exchange with the ATF. A certain difference may be generated between the temperature of the frictional engagement element and the temperature of the ATF. Japanese Unexamined Patent Application Publication No. 2008-101705 (hereinafter, referred to as the document '705) discloses a technique that calculates the temperature of at least a frictional engagement element to be engaged during speed change, and controls a timer such that an upshift timing for the frictional engagement element to be engaged is delayed by a predetermined time if the calculated temperature is higher than a reference temperature. In this case, since the upshift timing is delayed by the predetermined time, the frictional engagement element to be engaged can be cooled, and the heat generation can be suppressed.

Japanese Unexamined Patent Application Publication No. 2006-46569 (hereinafter, referred to as the document '569) discloses a technique that, when a downshift instruction is given, inhibits a downshift operation relating to the downshift instruction if an operation state of an engine is in a predetermined high-load high-rotation region, and if it is judged that a frictional engagement element to be disengaged is at a predetermined high temperature. In this case, by inhibiting the downshift operation if the frictional engagement element is at the predetermined high temperature, the frictional engagement element can be cooled, and the heat generation can be suppressed. The temperature of the frictional engagement element is not actually measured. A timer counts an elapsed time since a previous speed change operation is ended. If the elapsed time is within a predetermined time, it is expected that the frictional engagement element is at the predetermined high temperature.

With the technique disclosed in the document '705, since the temperature of the frictional engagement element is calculated only during the speed change, an increase in temperature during in-gear with a high load is not considered. In addition, a heat quantity term, a temperature increase term, and a cooling term likely depend on turning. The development of these terms may be troublesome work. Also, it is difficult to reliably protect the frictional engagement element unless a timer operation time is set under the most severe condition. A regulation time (a delay time of the upshift timing) has to be long. A driving force provided to a driver may be insufficient due to the response delay. Further, merely the heat generation during the upshift is handled, whereas heat generation during downshift is not considered. Further, since the upshift timing is uniformly delayed at the temperature of a predetermined threshold or higher, the control is rough.

With the technique disclosed in the document '569, it is expected that the temperature of the frictional engagement element is at the predetermined high temperature during the predetermined operation time of the timer. It is difficult to reliably protect the frictional engagement element unless the timer operation time is set under the most severe condition. Thus, the regulation time (the time in which the downshift is inhibited) may be excessively long. A driving force provided to a driver may be insufficient. Also, merely the heat generation during the upshift is handled, whereas heat generation during downshift is not considered.

SUMMARY OF THE INVENTION

According to an aspect of the invention, a control device for an automatic transmission includes a speed change controller, a temperature calculator, a rotation difference calculator, a determining unit, and a delay unit. The speed change controller is configured to generate a speed change instruction. The temperature calculator is configured to calculate a temperature of at least one frictional engagement element among frictional engagement elements which are selectively engaged to control the automatic transmission. The rotation difference calculator is configured to calculate a rotation difference between an input and an output of the at least one frictional engagement element. The determining unit is configured to determine whether the at least one frictional engagement element is engageable or non-engageable based on the temperature and the rotation difference of the at least one frictional engagement element and a pattern of the speed change instruction. The delay unit is configured to delay engagement until the determining unit determines that the at least one frictional engagement element is engageable, if the determining unit determines that the at least one frictional engagement element is non-engageable when the speed change controller generates the speed change instruction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the invention will be described below in detail with reference to the attached drawings.

Figure 1:
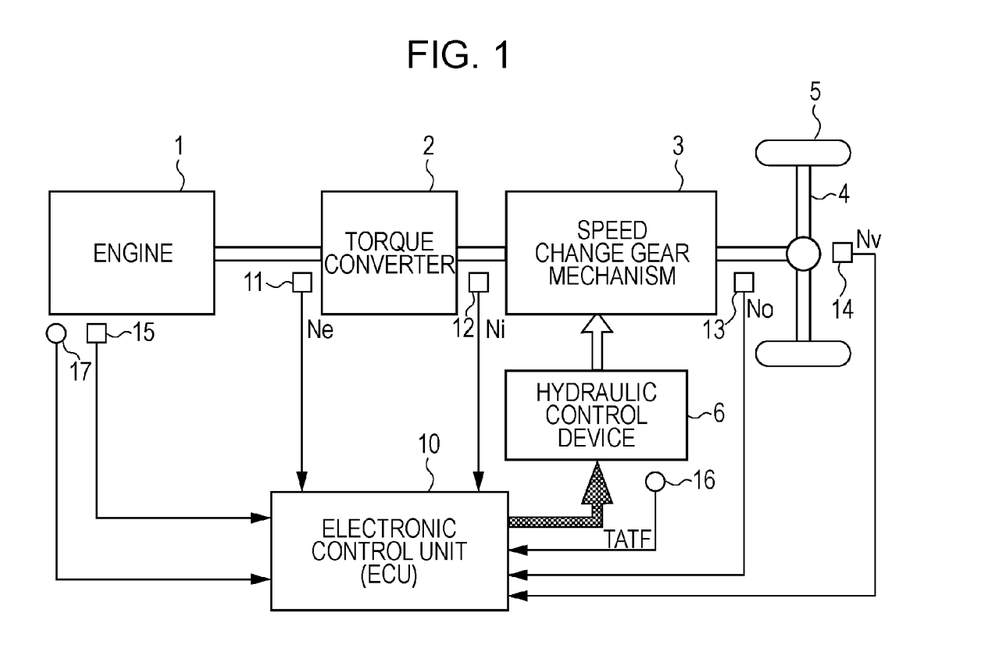
FIG. 1 is a block diagram briefly showing a power transmission system and a control system of a vehicle that includes a control device for an automatic transmission according to an embodiment of the invention.

FIG. 1 is a block diagram briefly showing a power transmission system and a control system of a vehicle that includes a control device for an automatic transmission according to an embodiment of the invention. The power transmission system of the vehicle includes an engine 1 serving as a power source; a torque converter 2 serving as a fluid joint for transmitting a rotational output of the engine 1 to a speed change gear mechanism 3; the speed change gear mechanism 3 that receives a rotational output from the torque converter 2, changes a speed with a predetermined speed ratio, and outputs a rotational output; and a differential gear mechanism 4 that distributes the output from the speed change gear mechanism 3 to left and right wheels (for example, rear wheels) 5. The torque converter 2 and the speed change gear mechanism 3 are provided with a hydraulic control device 6. The hydraulic control device 6 engages or disengages frictional engagement elements (clutches or the like) of a hydraulic control type provided in the torque converter 2 and the speed change gear mechanism 3, so as to lock up the torque converter 2, and to set an input/output speed ratio in the speed change gear mechanism 3 to a predetermined speed stage. The automatic transmission of the vehicle includes the torque converter 2, the speed change gear mechanism 3, the hydraulic control device 6, etc.

The control system that controls the power transmission system of the vehicle includes sensors provided at respective parts of the vehicle, an electronic control unit (ECU) 10 that receives the outputs of the sensors, and the hydraulic control device 6 that is controlled by the ECU 10. A rotation sensor 11 detects a rotation speed (engine speed) Ne of an input shaft of the torque converter 2. A rotation sensor 12 detects a rotation speed Ni of an input shaft of the speed change gear mechanism 3. A rotation sensor 13 detects a rotation speed No of an output shaft of the speed change gear mechanism 3. A vehicle speed sensor 14 detects a vehicle speed Nv. A throttle sensor 15 detects an opening of a throttle of the engine 1. The opening of the throttle is set in accordance with a depressing degree of an accelerator pedal. An ATF temperature sensor 16 detects an automatic transmission fluid (ATF) temperature (TATF) in the hydraulic control device 6. A coolant temperature sensor 17 detects a temperature of engine coolant.

The specific configurations of the power transmission system and the control system of the vehicle shown in FIG. 1 may use the configurations which have been already provided in related art. The control device for the automatic transmission according to the embodiment is included in the ECU 10, and is provided as one of various control functions executable by the ECU 10. The control device for the automatic transmission of the embodiment of the invention is executed by a computer program included in the ECU 10. However, the control device of the invention is not limited to the computer program, and may be dedicated electronic circuit hardware.

Figure 2:
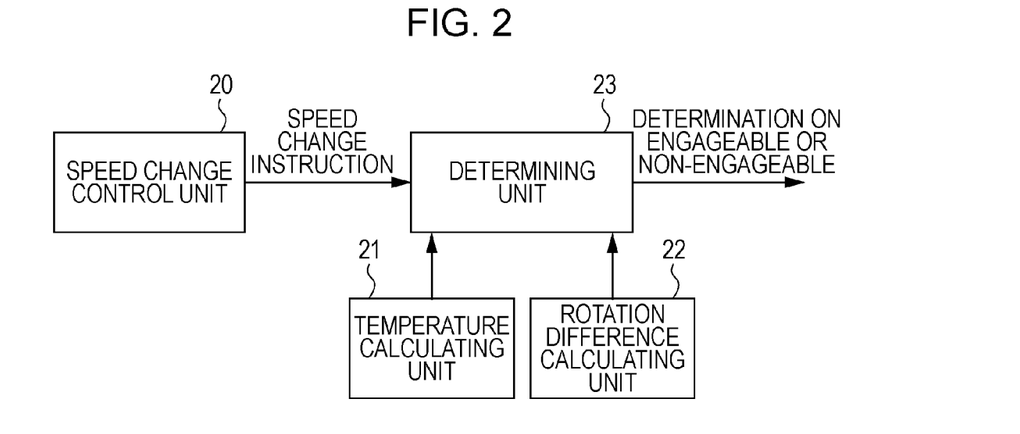
FIG. 2 is a block diagram showing a functional configuration of the control device for the automatic transmission according to the embodiment.

FIG. 2 is a block diagram showing a functional configuration of the control device for the automatic transmission according to the embodiment. The illustrated functions are executed by the ECU 10.

A speed change controller 20 determines an optimum speed stage in accordance with a driving state of the vehicle, and generates a speed change instruction for instructing gearshift to the determined speed stage. The speed change controller 20 may be a configuration which has been already provided in an automatic speed change control technique for a vehicle.

A temperature calculator 21 performs an operation for calculating a temperature of at least a frictional engagement element (to be more specific, a clutch plate) relating to the speed change. A specific method of calculating a temperature may be a method which has been already provided in related art, such as the document '705.

A rotation difference calculator 22 performs an operation for calculating a rotation difference between an input and an output of at least the frictional engagement element (the clutch plate) relating to the speed change. A specific method of calculating a rotation difference may be a method which has been already provided in related art, such as the document '705.

A determining unit 23 determines whether the frictional engagement element (the clutch) subjected to the speed change instruction is engageable or non-engageable, on the basis of the calculated temperature and rotation difference of the frictional engagement element, and a pattern of the speed change instruction generated by the speed change controller 20. The pattern of the speed change instruction is a speed change mode to be performed this time. For example, provided are a pattern in which the currently generated speed change instruction is upshift, a pattern in which the speed change instruction is downshift, a pattern in which the speed change instruction is direct downshift by skipping one or more stages, and a pattern in which the speed change instruction is progressive downshift by two or more stages. When the speed change controller 20 generates the speed change instruction, if the determining unit 23 determines that the frictional engagement element is non-engageable, a clutch engagement control signal for the speed change is not given to the hydraulic control device 6, and hence the clutch is not engaged (engagement is suspended). Accordingly, the facing of the clutch is prevented from being burned due to the heat generated by the engagement. Since the engagement is suspended, when the clutch is cooled, the temperature calculated in real time by the temperature calculator 21 is decreased, or the rotation difference calculated in real time by the rotation difference calculator 22 is decreased. Then, the determining unit 23 determines that the clutch is engageable. The clutch engagement control signal for the speed change is given to the hydraulic control device 6, and the clutch engagement for the speed change is performed. Thus, the engagement operation of the clutch is properly delayed.

Figure 3A:
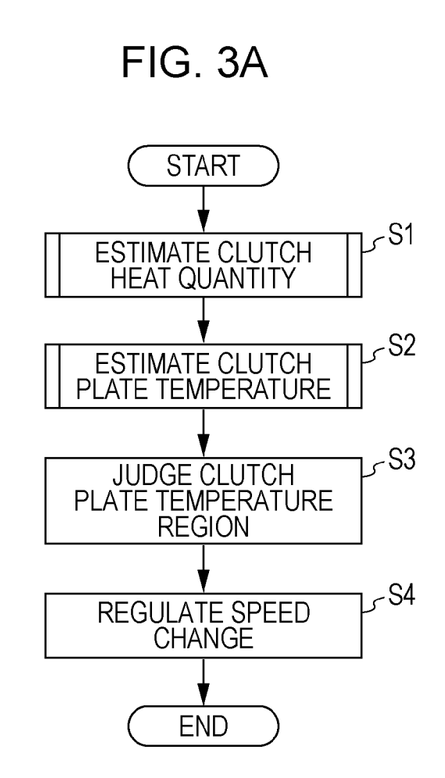
FIGS. 3A and 3B are flowcharts showing an example in which a function of the control device for the automatic transmission according to the embodiment is provided by a computer program.
Figure 3B:
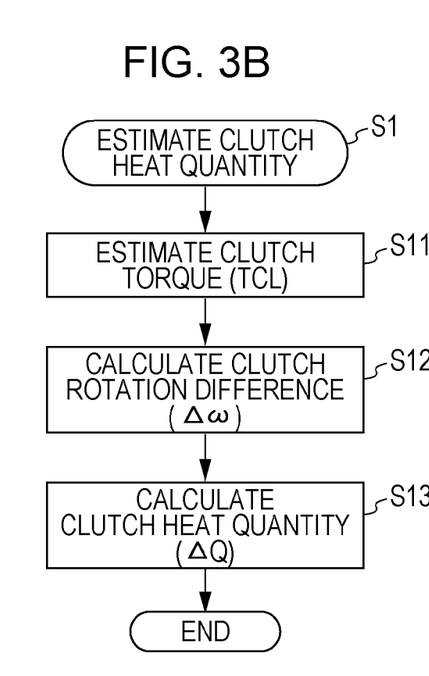
Figure 3C:
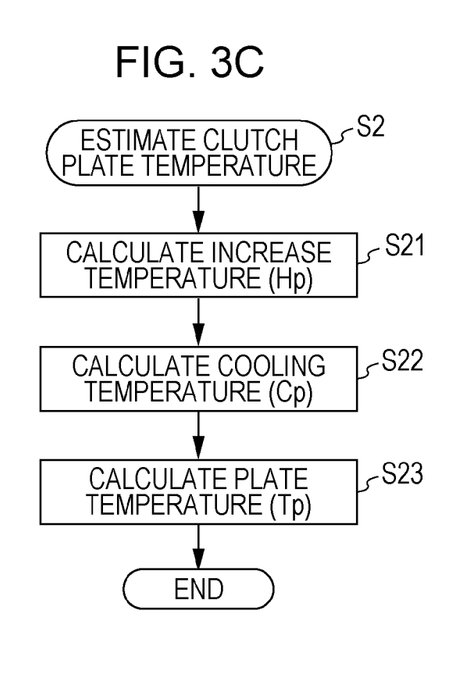

FIGS. 3A to 3C are flowcharts showing an example in which the functions of the units 20 to 23 are provided by a computer program installed in the ECU 10. A routine to "estimate clutch heat quantity" in step S1 and a routine to "estimate clutch plate temperature" in step S2 in FIG. 3A correspond to a function of the temperature calculator 21. FIG. 3B shows a specific example of the routine to "estimate clutch heat quantity" in step S1. FIG. 3C shows a specific example of the routine to "estimate clutch plate temperature" in step S2. Also, to "calculate clutch rotation difference" in step S12 in FIG. 3B corresponds to a function of the rotation difference calculator 22. The functions have been already provided in related art, and hence will be merely briefly described below. A routine to "judge clutch plate temperature region" in step S3 and a routine to "regulate speed change" in step S4 in FIG. 3A correspond to a function of the determining unit 23. The process routines in FIGS. 3A to 3C are repeatedly executed upon interruption by a timer, so that operations such as temperature calculation, rotation difference calculation, and determination, are executed in real time.

Referring to FIG. 3A, in the routine to "estimate clutch heat quantity" in step S1, an operation is performed to estimate in real time heat quantities of respective clutches relating to the speed change, that is, a clutch (ON clutch) that is newly engaged and a clutch (OFF clutch) that is disengaged.

In the routine to "estimate clutch heat quantity," referring to FIG. 3B, a clutch torque TCL of the clutch is estimated in step S11 to "estimate clutch torque." For example, a filling factor of fluid in the clutch is calculated on the basis of an instructed clutch engagement pressure and other necessary parameters. The clutch torque TCL is calculated on the basis of the filling factor.

In step S12 to "calculate clutch rotation difference," a rotation difference $\Delta\omega$ between the input and the output of the clutch is calculated. The rotation difference $\Delta\omega$ is calculated on the basis of the input rotation speed Ni, the output rotation speed No, and the gear ratio of the transmission.

In step S13 to "calculate clutch heat quantity," a clutch heat quantity $\Delta Q$ of the clutch per unit time is calculated as, for example, a product ($\Delta Q=TCL\cdot\Delta\omega$) of the clutch torque TCL and the rotation difference $\Delta\omega$. Herein, the unit time corresponds to an interruption period with which the process routines in FIGS. 3A to 3C are repeated upon the interruption by the timer.

Referring to FIG. 3A, in the routine to "estimate clutch plate temperature" in step S2, the clutch plate temperature of each clutch is estimated. Herein, current clutch plate temperatures for all clutches are estimated and managed. The temperature is increased due to the heat generation by the engaged clutch, however, the temperatures of all clutches are decreased in real time due to cooling after the disengagement of the engaged clutch. When the not-engaged clutch is subjected to be engaged next by the speed change operation, in order to immediately calculate the current clutch plate temperature, the clutch plate temperatures of all clutches have to be estimated and managed.

In the routine to "estimate clutch plate temperature," referring to FIG. 3C, an increase temperature Hp of the clutch is calculated on the basis of the clutch heat quantity $\Delta Q$ in step S21 to "calculate increase temperature." The increase temperature Hp is a temperature increment that is estimated to be increased during one timer interruption period of the process routines in FIGS. 3A to 3C that are repeated upon the interruption by the timer. Regarding the clutches not relating to the speed change of this time, the increase temperature Hp may be substantially 0.

In step S22 to "calculate cooling temperature," a cooling temperature Cp of each clutch is calculated. The cooling temperature Cp is a temperature decrement that is estimated to be decreased during one timer interruption period. For example, the cooling temperature Cp is calculated by using the quantity and temperature of lubricant of each clutch as parameters serving as factors for the temperature decrease.

In step S23 to "calculate plate temperature," a current clutch plate temperature Tp of each clutch is calculated. The current clutch plate temperature Tp can be obtained by adding and subtracting the increase temperature Hp and the cooling temperature Cp to and from a clutch plate temperature Tp_prev that is obtained for the clutch in a former operation. In particular, Tp=Tp_prev+Hp+Cp, where Cp has a sign of minus.

Figure 4:
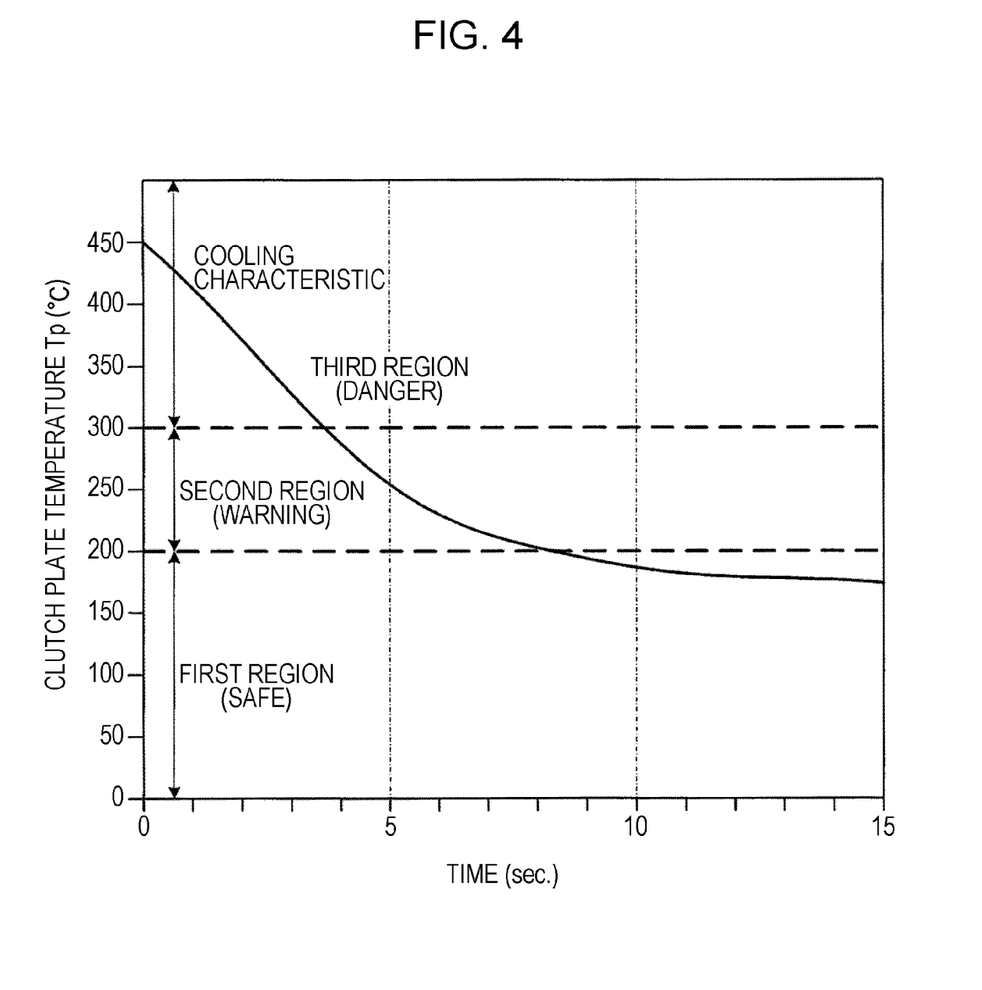
FIG. 4 is a graph showing an example of a plurality of temperature regions.

In FIG. 3A, the routine to "judge clutch plate temperature region," it is judged which region, from among a plurality of temperature regions, the current clutch plate temperature Tp of each clutch belongs to. For example, as shown in FIG. 4, three temperature regions are set as the clutch plate temperature regions. For example, a first temperature region (a safe region) has a range from about 0 to 200 degrees centigrade, a second temperature region (a warning region) has a range from about 200 to 300 degrees centigrade, and a third temperature region (a danger region) has a range from about 300 degrees centigrade and higher. FIG. 4 illustrates the example in a simple manner such that hysteresis setting is not provided for temperature increase and temperature decrease when the plurality of temperature regions are set, for the convenience of description. However, the hysteresis setting may be provided so that the thresholds defining the respective regions differ from one another by certain degrees. For example, a temperature region setting threshold applied when the clutch plate temperature Tp is increased may be higher than a temperature region setting threshold applied when the clutch plate temperature Tp is decreased, by certain degrees. For example, when a threshold in each region when the temperature is increased is set within the range from about 200 to 300 degrees centigrade as shown in FIG. 4, a threshold in each region when the temperature is decreased is set within, for example, a range from about 180 to 280 degrees centigrade. By providing the hysteresis setting, a hunting phenomenon at the boundary (in which the speed change is frequently regulated or the regulation is frequently released in quick response to a slight increase or decrease in the plate temperature, across the boundary between the temperature regions) can be prevented from occurring. It is to be noted that the number of temperature regions to be set is not limited to 3, and may be a larger number.

In the routine to "regulate speed change" in step S4, with reference to a predetermined speed change regulation rule (table) that determines whether the clutch is engageable or non-engageable, it is determined whether the engagement is allowable in the temperature region to which the current clutch plate temperature Tp of each clutch belongs.

Figure 5:
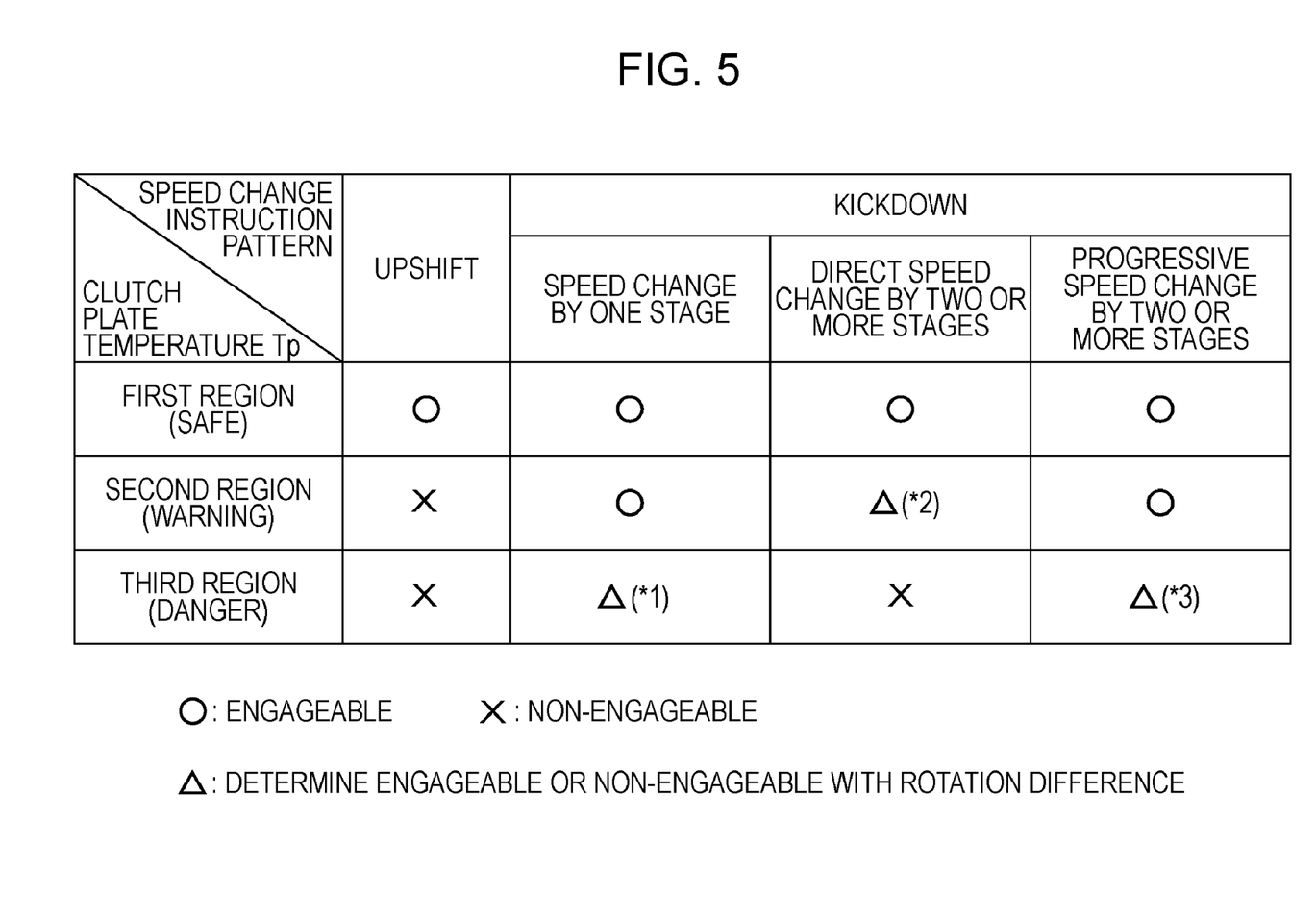
FIG. 5 is a table showing a list of a speed change regulation rule that determines a reference for judging whether a clutch is engageable or non-engageable in accordance with combinations between a pattern of a speed change instruction and a rotation difference in each of the temperature regions.

For example, as shown in FIG. 5, the speed change regulation rule (table) determines a reference for judging whether the clutch is engageable or non-engageable in accordance with a combination between a pattern of the speed change instruction and a rotation difference in each of the temperature regions set as described above. In FIG. 5, a circle (O) indicates engageable, a cross (X) indicates non-engageable, and a triangle (Δ) indicates non-engageable if the rotation difference is larger than a predetermined threshold or engageable under a certain condition. The signs (*1), (*2), and (*3) arranged next to triangle (Δ) mark each indicate that the engagement control mode when the rotation difference is larger than the predetermined threshold varies depending on the pattern of the speed change instruction.

For example, if the pattern of the speed change instruction pattern is "upshift," it is judged which temperature region the current clutch plate temperature Tp of the clutch for a speed stage after the speed change (target stage) belongs to. This is because more heat is generated by the clutch after the speed change (the target stage) (or by the clutch to be engaged) in the case of the upshift. Referring to the column for the "upshift" in FIG. 5, the engagement of the clutch is immediately allowed if the current clutch plate temperature Tp of the clutch belongs to the first temperature region (the safe region). In contrast, the engagement of the clutch is not allowed if the current clutch plate temperature Tp belongs to the second temperature region (the warning region) or the third temperature region (the danger region). A specific example of engagement control in this case will be described below with reference to FIG. 4.

In FIG. 4, a curve called "cooling characteristic" is an example of a cooling characteristic of a clutch. The horizontal axis is time. For example, a clutch at about 450 degrees centigrade at 0 second is cooled (the temperature of the clutch is decreased) along the "cooling characteristic" curve in FIG. 4 as long as a specific heat-generating factor is not added (i.e., as long as the clutch is not engaged).

For example, it is assumed that a certain speed change instruction is generated at 0 second, this speed change instruction is the "upshift," and the temperature of the clutch to be engaged is about 450 degrees centigrade. Since the temperature is in the third region (the danger region), the clutch is non-engageable. Hence, the engagement instruction is not generated for the clutch. The clutch is gradually cooled while the clutch is not engaged. When the plate temperature Tp is decreased to the first temperature region (the safe region) after about 9 seconds have elapsed, it is determined that the clutch is engageable. The clutch is engaged, and the target speed stage is provided.

For another example, if the speed change instruction is the "upshift," and the temperature of the clutch to be engaged is about 310 degrees centigrade, the temperature of the clutch is in the third temperature region (the danger region). The clutch is non-engageable. Hence, the engagement instruction is not generated for the clutch. The clutch is gradually cooled while the clutch is not engaged. When the plate temperature Tp is decreased to the first temperature region (the safe region) after about 6 seconds have elapsed, it is determined that the clutch is engageable. The clutch is engaged, and the target speed stage is provided.

Next, a case in which the pattern of the speed stage instruction is the "downshift" will be described. In the case of the "downshift," it is judged which temperature region the current clutch plate temperature Tp of the clutch at a speed stage before the speed change (the clutch to be disengaged) belongs to. This is because more heat is generated by the clutch before the speed change (the current speed stage) (or by the clutch to be disengaged) in the case of the downshift.

Figure 6A:
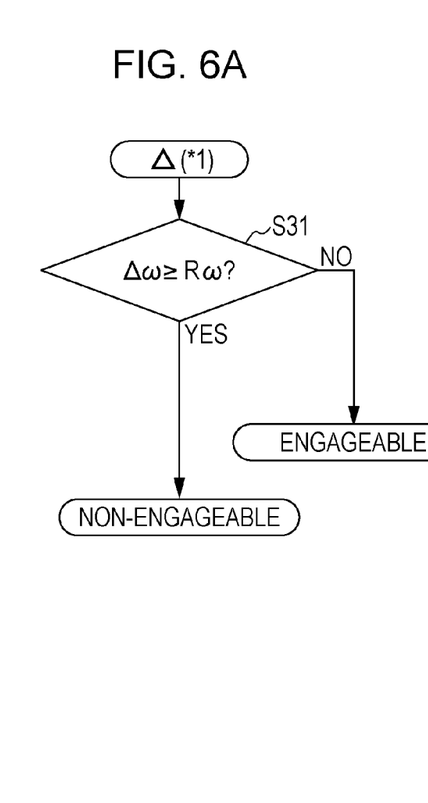
FIGS. 6A to 6C are flowcharts showing an example of a procedure for the determination whether the clutch is engageable or non-engageable and control under a specific speed change regulation rule.

If the pattern of the speed change instruction is "downshift by one stage," referring to the column for "kickdown" and "speed change by one stage" in FIG. 5, it is determined that (O) the clutch is engageable if the current clutch plate temperature Tp of the clutch belongs to the first temperature region (the safe region) or the second temperature region (the warning region). The disengagement of the current clutch and the engagement of the clutch after the speed change (at the target speed stage) are allowed. If the current clutch plate temperature Tp belongs to the third temperature region (the danger region), determination on engageable or non-engageable is made with regard to the rotation difference Δω of the clutch (Δ (*1)). FIG. 6A is a flowchart for briefly showing the determination on engageable or non-engageable for "Δ (*1)." If the current clutch plate temperature Tp belongs to the third temperature region (the danger region), and if the rotation difference Δω of the clutch is a predetermined threshold Rω or larger, it is determined that the clutch is non-engageable (YES in step S31). In contrast, even though the current clutch plate temperature Tp belongs to the third temperature region (the danger region), if the rotation difference Δω of the clutch is smaller than the predetermined threshold Rω, it is determined that the clutch is engageable (NO in step S31). This is because, as the rotation difference Δω of the clutch is larger, the heat quantity is larger. Hence, even in the same temperature region, the risk due to the heat generation depends on the degree of the clutch rotation difference Δω. In this case, if it is determined that the clutch is non-engageable, the engagement of the clutch before the speed change (the current speed stage) (i.e., the clutch to be disengaged) is held. If the rotation difference Δω of the clutch becomes smaller than the predetermined threshold Rω, or if the temperature of the clutch is decreased to the second temperature region (the warning region), it is determined that the clutch is engageable. The downshift corresponding to the speed change instruction is executed. As described above, in the region subjected to the speed change regulation, the engagement is delayed until it is determined that the clutch is engageable. The predetermined threshold Rω may be properly determined experimentally or empirically in accordance with the specification of the vehicle or the transmission or the like to which the configuration is applied. The predetermined threshold Rω may have hysteresis characteristics or a neutral zone (value or time) for the situations when the rotation difference is increased and when the rotation difference is decreased.

For another example of a speed change regulation rule when the pattern of the speed change is "downshift by one stage," a predetermined high temperature region may be set so as to uniformly determine that the clutch is non-engageable if the clutch plate temperature belongs to a predetermined high temperature region, without the clutch rotation difference being considered.

When the pattern of the speed change instruction is "downshift by skipping one or more stages," referring to the column for "kickdown" and "direct speed change by two or more stages," it is determined that (O) the clutch before the speed change (at the current speed stage) (i.e., the clutch to be disengaged) is engageable if the current clutch plate temperature Tp belongs to the first temperature region (the safe region). The disengagement of the clutch before the speed change and the engagement of the clutch after the speed change (at the target speed stage) are allowed. If the current clutch plate temperature Tp belongs to the third temperature region (the danger region), it is determined that (X) the clutch is non-engageable. In contrast, if the current clutch plate temperature Tp belongs to the second temperature region (the warning region), the determination on engageable or non-engageable is made and the control thereof is performed with regard to the rotation difference Δω of the clutch (Δ (*2)). In the case of "downshift by skipping one or more stages," for example, if kickdown from a sixth speed to a fourth speed is performed, or if kickdown from a fifth speed to a third speed is performed, the clutch at the previous stage works until the clutch is changed to the clutch at the next stage with a higher common ratio. Thus, the heat quantity generated at the clutch at the previous stage (the clutch to be disengaged) during the speed change operation is large. In the case of "downshift by one stage," the speed change regulation is not performed (O) in the second temperature region (the warning region). In the case of "downshift by skipping one or more stages," conditional speed change regulation is performed (Δ (*2)) in the second temperature region (the warning region).

Figure 6B:
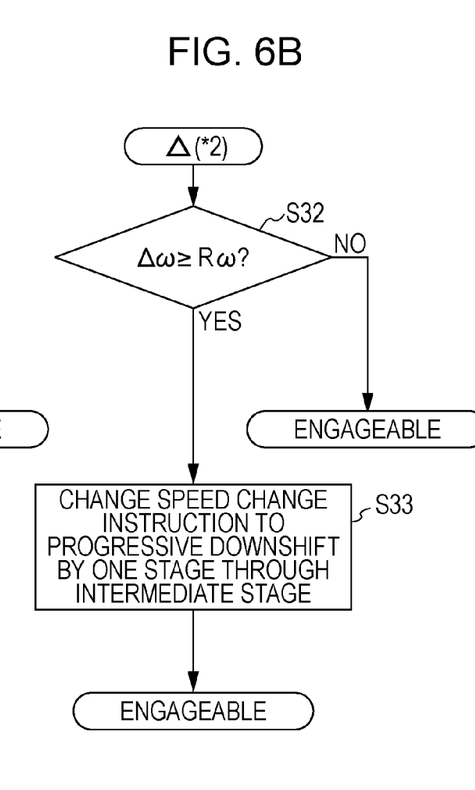

In the conditional speed change control (Δ (*2)), it is not simply determined that the clutch is non-engageable if the rotation difference Δω of the clutch in the second temperature region (the warning region) is the predetermined threshold or larger, but it is determined that the direct speed change is inhibited from the previous stage (for example, from the sixth speed) to the next stage by skipping one or more stages (for example, to the fourth speed). Instead of this, the speed change instruction is changed to progressive downshift by one step each through an intermediate stage (for example, the fifth speed). Then, it is determined that the clutch is engageable, and the clutch is engaged. FIG. 6B is a flowchart for the determination whether the clutch is engageable or non-engageable and control relating to "Δ (*2)." If the rotation difference Δω of the clutch is the predetermined threshold Rω or larger, the speed change instruction is changed to the progressive downshift on a one-stage basis through the intermediate stage, and it is determined that the clutch is engageable (process from YES in step S32 to step S33). Thus, the instruction is given to disengage the clutch at the previous stage (for example, the sixth speed), and the instruction is given to select the intermediate stage (for example, the fifth speed) as the target stage of the downshift and causes the clutch at the intermediate stage (for example, the fifth speed) to be engaged. Then, the instruction is given to disengage the clutch at the intermediate stage (for example, the fifth speed), and the instruction is given to select the next stage (for example, the fourth speed) as the target stage of the downshift and causes the clutch at the next stage (for example, the fourth speed) to be engaged. In this way, the progressive downshift on a one-stage basis is selected and performed. Since the direct speed change by skipping one or more stages is changed to the progressive downshift on a one-stage basis, the work of the clutch at the previous stage is partly distributed to the clutch at the intermediate stage, and hence the work of the clutch at the previous stage is decreased. Thus, the heat quantity is decreased, and the clutch at the previous stage (for example, the sixth speed) can be protected from burnout. In the conditional speed change regulation (Δ (*2)), even though the temperature of the clutch belongs to the second temperature region (the warning region), if the rotation difference Δω is smaller than the predetermined threshold, it is determined that the clutch is engageable (NO in step S32).

For another example for the speed change regulation rule when the pattern of the speed change instruction is "downshift by skipping one or more stages," a predetermined temperature region may be set such that, if the clutch plate temperature belongs to a predetermined temperature region, the speed change regulation of Δ (*2) is uniformly applied to the clutch without the clutch rotation difference being considered. In particular, if the clutch plate temperature belongs to the predetermined temperature region, the direct speed change in which the clutch at the previous stage (for example, the sixth speed) is changed to the next stage (for example, the fourth speed) by skipping one or more stages may be inhibited. Instead of this, the speed change instruction may be changed to the instruction for the progressive downshift on a one-stage basis through the intermediate stage (for example, the fifth speed). Then, it is determined that the clutch is engageable and the engagement is performed.

If the pattern of the speed change instruction is "progressive downshift by two or more stages," referring to the column for "downshift" and "progressive speed change by two or more stages," if the current clutch plate temperature Tp of the clutch before the speed change (the current speed stage) (i.e., the clutch to be disengaged) belongs to the first temperature region (the safe region) or the second temperature region (the warning region), it is determined that the clutch is engageable (O). The disengagement of the clutch and the engagement of the clutch at the intermediate stage are allowed, and then the progressive downshift to the target stage is allowed. However, if the current clutch plate temperature Tp of the clutch (the clutch to be disengaged) belongs to the third temperature region (the danger region), the speed change regulation considering the rotation difference Δω of the clutch is performed (Δ (*3)).

The speed change regulation of Δ (*3) includes first regulation and second regulation. In the first regulation, if the current clutch plate temperature Tp belongs to the third temperature region (the danger region), and if the rotation difference Δω of the clutch is the predetermined threshold or larger, it is determined that the clutch is non-engageable from the speed stage before the speed change (the current speed stage) to the intermediate stage, and the engagement to the intermediate stage is delayed. In the second regulation, if the current clutch plate temperature Tp belongs to the third temperature region (the danger region), and if the rotation difference Δω of the clutch is smaller than the predetermined threshold, it is determined that the clutch is engageable from the speed stage before the speed change (the current speed stage) to the intermediate stage, and the clutch is immediately engaged to the intermediate state. However, the engagement from the intermediate stage to the next stage (for example, the target stage) is delayed. Herein a method of delaying the engagement from the intermediate stage to the next stage (for example, the target stage) in the second regulation may be counting a predetermined delay time by a timer. However, it is not limited thereto. For example, it may be assumed that a delay time is properly provided if the temperature or rotation difference of the clutch at the speed stage before the speed change becomes a predetermined value or smaller.

The second regulation is executed because, in the case of the progressive downshift by two or more stages from a speed stage at the high clutch plate temperature Tp to another speed stage, a time is required until the fluid in the clutch is discharged and the clutch loses the capacity even after the work is given to the intermediate stage. It may be more difficult to discharge the fluid as the rotation speed is higher. If the rotation speed is continuously increased, the time required until the clutch loses the capacity extends, and the rotation difference becomes large. Thus, the heat quantity of the clutch at the previous stage is increased. Owing to this, the speed change to the next stage is delayed while the clutch at the intermediate stage is engaged, so as to discharge the fluid, and to decrease the heat quantity to a quantity equivalent to that at normal speed change by one stage.

Figure 6C:
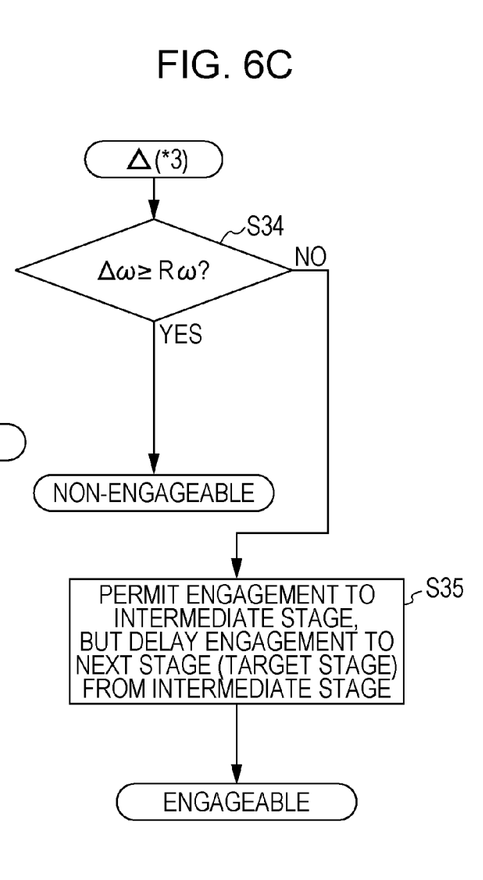

FIG. 6C is a flowchart for the determination whether the clutch is engageable or non-engageable and control relating to "Δ (*3)." If the rotation difference Δω of the clutch is the predetermined threshold Rω or larger, it is determined that the clutch is non-engageable (YES in step S34, the first regulation). In contrast, if the rotation difference Δω of the clutch is smaller than the predetermined threshold Rω, it is determined that the clutch is engageable from the speed stage before the speed change (the current speed stage) to the intermediate stage, and hence the engagement to the intermediate stage is immediately performed. However, the engagement from the intermediate stage to the next stage is delayed (process from NO in step S34 to step S35, the second regulation).

For example, when the progressive downshift is performed from the sixth speed, through the fifth speed, to the fourth speed, in the case of the first regulation, the clutch is not engageable from the sixth speed (the current speed stage) to the fifth speed (the intermediate stage), and the engagement of the clutch (to be disengaged) at the sixth speed (the current speed stage) is held. In this case, if the rotation difference $\Delta\omega$ of the clutch becomes smaller than the predetermined threshold, or if the temperature is decreased to the second temperature region (the warning region), it is determined that the clutch is engageable. As described above, in the first regulation, the engagement is delayed until it is determined that the clutch is engageable. In contrast, in the case of the second regulation, it is determined that the clutch is engageable from the sixth speed (the current speed stage) to the fifth speed (the intermediate stage). The clutch at the sixth speed (the current speed stage) is disengaged, and the clutch at the fifth speed (the intermediate stage) is engaged. Then, the clutch engagement from the fifth speed (the intermediate stage) to the next stage (the fourth speed that is the target stage) is controlled to have a certain delay.

For another example for the speed change regulation rule when the pattern of the speed change instruction is "progressive downshift by two or more stages," a predetermined temperature region may be set so that the second regulation is uniformly applied if the clutch plate temperature belongs to the predetermined temperature region, without the clutch rotation difference being considered. That is, if the clutch plate temperature is within the predetermined temperature region, it is determined that the clutch is engageable from the speed stage before the speed change (the current speed stage) to the intermediate stage, and the engagement to the intermediate stage is immediately performed. However, the engagement from the intermediate stage to the next stage (for example, the target stage) may have a certain delay.

For another example for the speed change regulation rule when the pattern of the speed change instruction is "upshift," a predetermined temperature region may be set with regard to the rotation difference of the clutch so that it is determined that the clutch is disengageable if the clutch rotation difference $\Delta\omega$ is the predetermined threshold or higher, whereas it is determined that the clutch is engageable if the clutch rotation difference $\Delta\omega$ is smaller than the predetermined threshold, in a case in which the clutch plate temperature is within the predetermined temperature region.

With the embodiment of the invention, the temperature of the frictional engagement element is calculated (detected), and the rotation difference between the input and the output of the frictional engagement element is detected. Then, it is determined whether the frictional engagement element is engageable on the basis of the calculated temperature and rotation difference of the frictional engagement element, and the pattern of the speed change instruction. If it is determined that the frictional engagement element is non-engageable, the engagement is delayed until it is determined that the friction engagement element is engageable. Herein, the pattern of the speed change instruction is a speed change pattern to be performed in response to a currently given speed change instruction. The pattern may include upshift, downshift by one stage, direct downshift by two or more stages (downshift by skipping one or more stages), progressive downshift by two or more stages, etc. The temperature and rotation difference of the frictional engagement element are continuously calculated (detected). Referring to a combination between the calculated values with the pattern of the speed change instruction, it is determined that the frictional engagement element is non-engageable if the frictional engagement element may be burned, and the engagement is delayed. Accordingly, a cooling period is provided. If the temperature of the frictional engagement element is decreased, the frictional engagement element is determined as engageable, and the engagement of the frictional engagement element for the speed change is performed. Thus, the engagement control can be performed while the frictional engagement element is protected from heat damage. Also, since an additional time counting operation is not necessary. An excessive delay for engagement does not occur. Thus, a driving force can be maximally provided to a driver without providing excessive regulation for the engagement. Also, since the engagement is determined with regard to the rotation difference in addition to the temperature. Fine engagement control can be performed. In view of this, a driving force can be maximally provided to the driver. Further, a tuning element can be maximally eliminated. The development efficiency can be increased. Furthermore, the control takes into account the pattern of the speed change instruction. Heat generated during upshift and downshift can be settled.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an automatic transmission, comprising:
   a speed change controller configured to generate a speed change instruction;
   a temperature calculator configured to calculate a temperature of at least one frictional engagement element among frictional engagement elements which are selectively engaged to control the automatic transmission;
   a rotation difference calculator configured to calculate a rotation difference between an input and an output of the at least one frictional engagement element;
   a determining unit configured to determine whether the at least one frictional engagement element is engageable or non-engageable based on the temperature and the rotation difference of the at least one frictional engagement element and a pattern of the speed change instruction; and
   a delay unit configured to delay engagement until the determining unit determines that the at least one frictional engagement element is engageable, if the determining unit determines that the at least one frictional engagement element is non-engageable when the speed change controller generates the speed change instruction,
   wherein at least one of the speed change controller, the temperature calculator, the rotation difference calculator, the determining unit, and the delay unit is a component of an electronic control unit.

2. The control device for the automatic transmission according to claim 1,
   wherein the determining unit is configured to set a plurality of temperature regions,
   wherein the determining unit includes a table to judge whether the at least one frictional engagement element is engageable or non-engageable in accordance with a combination between the pattern of the speed change instruction and the rotation difference of the at least one frictional engagement element in each of the temperature regions, and wherein the determining unit is configured to judge whether the at least one frictional engagement element is engageable or non-engageable with reference to the table by using the temperature and the rotation difference of the at least one frictional engagement element and using the pattern of the speed change instruction.

3. The control device for the automatic transmission according to claim 2,
wherein, in a case in which the pattern of the speed change instruction is downshift by one stage, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement,
wherein, even though the temperature of the at least one frictional engagement element belongs to the predetermined temperature region, if the rotation difference of the at least one frictional engagement element is smaller than the predetermined threshold, the determining unit determines that the at least one frictional engagement element is engageable, and
wherein, if the temperature of the at least one frictional engagement element belongs to a lower temperature region than the predetermined temperature region, the determining unit determines that the at least one frictional engagement element is engageable.

4. The control device for the automatic transmission according to claim 3,
wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage,
wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and
wherein, if the temperature of the frictional engagement element belongs to a lower temperature region than the predetermined temperature region, the determining unit determines that the at least one frictional engagement element is engageable.

5. The control device for the automatic transmission according to claim 2,
wherein, in a case in which the pattern of the speed change instruction is downshift in which one or more stages are skipped, if the temperature of the at least one frictional engagement element belongs to a predetermined temperature among the temperature regions and if the rotation difference of the at least one frictional engagement element is a predetermined threshold or higher, the pattern of the speed change instruction is changed to a pattern of progressive downshift on a one-stage basis, and then the determining unit determines that the at least one frictional engagement element is engageable,
wherein, even though the temperature of the at least one frictional engagement element belongs to the predetermined temperature region, if the rotation difference of the frictional engagement element is smaller than the predetermined threshold, the determining unit determines that the at least one frictional engagement element is engageable, and
wherein, if the temperature of the at least one frictional engagement element belongs to a lower temperature region than the predetermined temperature region, the determining unit determines that the at least one frictional engagement element is engageable.

6. The control device for the automatic transmission according to claim 5,
wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage,
wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and
wherein, if the temperature of the frictional engagement element belongs to a lower temperature region than the predetermined temperature region, the determining unit determines that the at least one frictional engagement element is engageable.

7. The control device for the automatic transmission according to claim 2,
wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage,
wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and
wherein, if the temperature of the frictional engagement element belongs to a lower temperature region than the predetermined temperature region, the determining unit determines that the at least one frictional engagement element is engageable.

8. The control device for the automatic transmission according to claim 2,
wherein, in a case in which the pattern of the speed change instruction is upshift, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement,
wherein, even though the temperature of the frictional engagement element belongs to the predetermined temperature region, if the rotation difference of the at least one frictional engagement element is smaller than the predetermined threshold, the determining unit determines that the at least one frictional engagement element is engageable, and
wherein, if the temperature of the at least one frictional engagement element belongs to a lower temperature region than the predetermined temperature region, the determining unit determines that the at least one frictional engagement element is engageable.

9. The control device for the automatic transmission according to claim 1,
wherein, in a case in which the pattern of the speed change instruction is downshift by one stage, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement,
wherein, even though the temperature of the at least one frictional engagement element belongs to the predetermined temperature region, if the rotation difference of the at least one frictional engagement element is smaller than the predetermined threshold, the determining unit determines that the at least one frictional engagement element is engageable, and
wherein, if the temperature of the at least one frictional engagement element belongs to a lower temperature region than the predetermined temperature region, the determining unit determines that the at least one frictional engagement element is engageable.

10. The control device for the automatic transmission according to claim 9,
wherein, in a case in which the pattern of the speed change instruction is downshift in which one or more stages are skipped, if the temperature of the at least one frictional engagement element belongs to a predetermined temperature among the temperature regions and if the rotation difference of the at least one frictional engagement element is a predetermined threshold or higher, the pattern of the speed change instruction is changed to a pattern of progressive downshift on a one-stage basis, and then the determining unit determines that the at least one frictional engagement element is engageable,
wherein, even though the temperature of the at least one frictional engagement element belongs to the predetermined temperature region, if the rotation difference of the frictional engagement element is smaller than the predetermined threshold, the determining unit determines that the at least one frictional engagement element is engageable, and
wherein, if the temperature of the at least one frictional engagement element belongs to a lower temperature region than the predetermined temperature region, the determining unit determines that the at least one frictional engagement element is engageable.

11. The control device for the automatic transmission according to claim 10,
wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage,
wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and
wherein, if the temperature of the frictional engagement element belongs to a lower temperature region than the predetermined temperature region, the determining unit determines that the at least one frictional engagement element is engageable.

12. The control device for the automatic transmission according to claim 9,
wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage,
wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and
wherein, if the temperature of the frictional engagement element belongs to a lower temperature region than the predetermined temperature region, the determining unit determines that the at least one frictional engagement element is engageable.

13. The control device for the automatic transmission according to claim 9,
wherein, in a case in which the pattern of the speed change instruction is upshift, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement, wherein, even though the temperature of the frictional engagement element belongs to the predetermined temperature region, if the rotation difference of the at least one frictional engagement element is smaller than the predetermined threshold, the determining unit determines that the at least one frictional engagement element is engageable, and wherein, if the temperature of the at least one frictional engagement element belongs to a lower temperature region than the predetermined temperature region, the determining unit determines that the at least one frictional engagement element is engageable.

14. The control device for the automatic transmission according to claim 1, wherein, in a case in which the pattern of the speed change instruction is downshift in which one or more stages are skipped, if the temperature of the at least one frictional engagement element belongs to a predetermined temperature among the temperature regions and if the rotation difference of the at least one frictional engagement element is a predetermined threshold or higher, the pattern of the speed change instruction is changed to a pattern of progressive downshift on a one-stage basis, and then the determining unit determines that the at least one frictional engagement element is engageable, wherein, even though the temperature of the at least one frictional engagement element belongs to the predetermined temperature region, if the rotation difference of the frictional engagement element is smaller than the predetermined threshold, the determining unit determines that the at least one frictional engagement element is engageable, and wherein, if the temperature of the at least one frictional engagement element belongs to a lower temperature region than the predetermined temperature region, the determining unit determines that the at least one frictional engagement element is engageable.

15. The control device for the automatic transmission according to claim 14, wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage, wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and wherein, if the temperature of the frictional engagement element belongs to a lower temperature region than the predetermined temperature region, the determining unit determines that the at least one frictional engagement element is engageable.

16. The control device for the automatic transmission according to claim 14, wherein, in a case in which the pattern of the speed change instruction is upshift, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement, wherein, even though the temperature of the frictional engagement element belongs to the predetermined temperature region, if the rotation difference of the at least one frictional engagement element is smaller than the predetermined threshold, the determining unit determines that the at least one frictional engagement element is engageable, and wherein, if the temperature of the at least one frictional engagement element belongs to a lower temperature region than the predetermined temperature region, the determining unit determines that the at least one frictional engagement element is engageable.

17. The control device for the automatic transmission according to claim 1, wherein, in a case in which the pattern of the speed change instruction is progressive downshift by two or more stages, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays engagement for speed change to an intermediate stage, wherein, if the temperature of the frictional engagement element belongs to the predetermined temperature region and if the rotation difference of the at least one frictional engagement element is smaller than the predetermined threshold, the determining unit determines that the at least one frictional engagement element is engageable, enables the engagement for speed change to the intermediate stage, and delays engagement for speed change from the intermediate stage to a next stage, and wherein, if the temperature of the frictional engagement element belongs to a lower temperature region than the predetermined temperature region, the determining unit determines that the at least one frictional engagement element is engageable.

18. The control device for the automatic transmission according to claim 17, wherein, in a case in which the pattern of the speed change instruction is upshift, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement, wherein, even though the temperature of the frictional engagement element belongs to the predetermined temperature region, if the rotation difference of the at least one frictional engagement element is smaller than the predetermined threshold, the determining unit determines that the at least one frictional engagement element is engageable, and wherein, if the temperature of the at least one frictional engagement element belongs to a lower temperature region than the predetermined temperature region, the determining unit determines that the at least one frictional engagement element is engageable.

19. The control device for the automatic transmission according to claim 1, wherein, in a case in which the pattern of the speed change instruction is upshift, if the temperature of the at least one frictional engagement element belongs to a predetermined temperature region among the temperature regions and if the rotation difference of the at least one frictional engagement element is a predetermined threshold or larger, the determining unit determines that the at least one frictional engagement element is non-engageable and delays the engagement, wherein, even though the temperature of the frictional engagement element belongs to the predetermined temperature region, if the rotation difference of the at least one frictional engagement element is smaller than the predetermined threshold, the determining unit determines that the at least one frictional engagement element is engageable, and wherein, if the temperature of the at least one frictional engagement element belongs to a lower temperature region than the predetermined temperature region, the determining unit determines that the at least one frictional engagement element is engageable.

20. A control device for an automatic transmission, comprising:

speed change controlling means for generating a speed change instruction;

temperature calculating means for calculating a temperature of at least one frictional engagement element among frictional engagement elements which are selectively engaged to control the automatic transmission;

rotation difference calculating means for calculating a rotation difference between an input and an output of the at least one frictional engagement element;

determining means for determining whether the at least one frictional engagement element is engageable or non-engageable based on the temperature and the rotation difference of the at least one frictional engagement element and a pattern of the speed change instruction; and delay means for delaying engagement until the determining means determines that the at least one frictional engagement element is engageable, if the determining means determines that the at least one frictional engagement element is non-engageable when the speed change controlling means generates the speed change instruction, wherein at least one of the speed change controlling means, the temperature calculating means, the rotation difference calculating means, the determining means, and the delay means is a component of an electronic control unit.

* * * * *